Sept. 22, 1953 C. W. JOHNSTONE ET AL 2,653,237
PULSE LENGTHENING CIRCUIT
Filed June 6, 1946
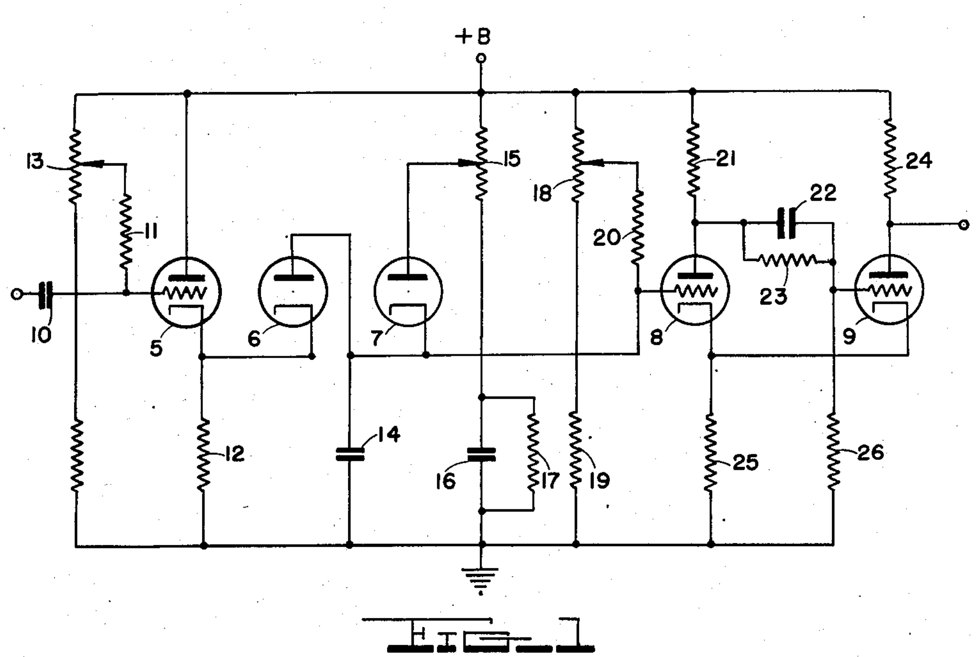
FIG. 1
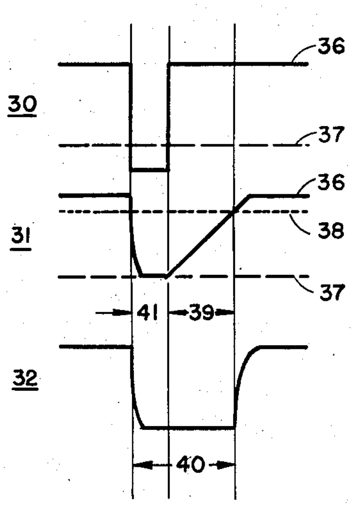
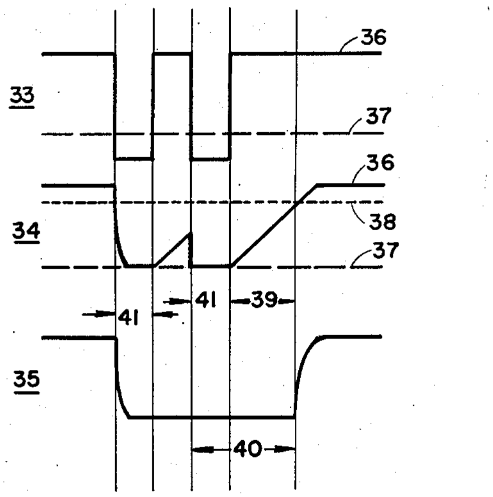
FIG. 2 FIG. 3
*INVENTORS*
CHARLES W. JOHNSTONE
HAROLD V. HANCE
*BY* M. O. Hayes
ATTORNEY Patented Sept. 22, 1953 2,653,237

UNITED STATES PATENT OFFICE 2,653,237

PULSE LENGTHENING CIRCUIT

Charles W. Johnstone, Garden City, N. Y., and Harold V. Hance, Washington, D. C., assignors to the United States of America as represented by the Secretary of the Navy Application June 6, 1946, Serial No. 674,768

5 Claims. (Cl. 250—27)

This invention relates generally to electronic circuits for stretching pulse time duration and particularly pulse stretching circuits requiring no recovery time between responses and producing negligible time delay between input and response pulses.

In radar, radio, television, and other electronic fields it is frequently desirable to respond to actuating signals with voltage pulses of a definite and recognizable duration greater than the actuating signal. However, known circuits are limited to responses from individual pulses relatively well separated and will give spurious response to a pulse received before the circuit has recovered from the previous pulse. This constitutes a limiting factor where it is desired that a circuit respond to a plurality of pulse sources having no time relation such as beacon equipment or to multiple pulse groups such as might be used in identification systems.

It is, therefore, an object of this invention to provide pulse stretching means which will respond to pulses applied at any time including pulses applied before the termination of a previous pulse or before the termination of the stretching of a previous pulse.

It is another object of this invention to provide pulse stretching means whose response begins with the leading edge of the actuating pulse and which will respond to pulses applied at any time including pulses applied before the termination of a previous pulse or before the termination of the stretching of a previous pulse.

It is another object of this invention to provide pulse stretching means wherein the degree of stretch is the same for every response but contains means for controlling said degree of stretch.

It is still another object of this invention to provide a pulse stretching circuit which may be so adjusted as to be relatively insensitive to random noise.

Other objects and advantages of the invention will be apparent from the following description and accompanying drawings in which similar characters of reference indicate similar items.

Referring now to the drawings:

Fig. 1 is a schematic diagram of one embodiment of this invention;

Fig. 2 is a series of waveforms illustrating the stretching of a pulse that is applied to the circuit in Fig. 1;

Fig. 3 shows the changes wrought in the waveform of Fig. 2 by a second pulse closely following the first.

Briefly, this invention comprises, in part, a regenerative trigger circuit which is so arranged as to have a stable state and an unstable state. In quiescence the circuit remains in the stable state until actuated by an incoming signal, whereupon it will regeneratively drive into its unstable state and remain in such state for a period depending upon a suitable time constant circuit which is incorporated therein. During the existence of the unstable state the circuit will produce an output pulse whose duration equals that of the unstable state. Means, including the time constant circuit, are added for applying the pulse to be stretched to the trigger circuit so that upon application of the same the trigger circuit will drive into its unstable state, or if it was already in its unstable state at the time of such application, it will so remain for the same period it would have remained unstable had it been in its stable state when the pulse was applied.

The invention may be better understood by reference to Fig. 1 in detail. The regenerative trigger circuit in the preferred embodiment herein shown is a direct coupled multivibrator comprising a pair of triode tubes 8 and 9 with their cathodes tied together and connected to ground through a common biasing resistor 25. The grid of the first tube 8 receives a high bias by its connection through a high resistance 20 to a sliding tap on a bleeder circuit 18 and 19 connected between B+ and ground. The second tube 9 of the multivibrator receives its grid bias from the bleeder circuit 21, 23, and 26 which is proportioned so that the stable state of the multivibrator exists when tube 8 is conducting and tube 9 is non-conducting. Resistor 21 in addition to serving as an element in the bleeder arrangement carries the plate load for the first tube 8 and therefore varies the grid bias on tube 9 in accordance with current variations in tube 8. Resistance 23 serves a second purpose of isolating the plate of tube 8 from the grid of tube 9. This resistor is shunted by a capacitance 22 to accelerate the reaction of tube 9 to changes occurring at tube 8. The output pulse of the circuit is taken from across the plate load resistance 24 of tube 9 so that upon application, for instance, of a negative signal to the grid of tube 8 the circuit will regenerate in the usual multivibrator manner to produce a negative pulse at the plate of tube 9. The duration of this pulse, for a given setting of potentiometer 18, is primarily controlled by the time constant comprising grid limiting resistance 20 of tube 8 and a suitable fixed capacitance 14, connected between the grid of tube 8 and ground. By so connecting capacitance 14 in the multivibrator, the circuit may be keyed into operation merely by discharging the capacitance 14. Upon the discharge of capacitor 14, the multivibrator will regenerate to its unstable state where tube 9 conducts and tube 8 cuts off, and will remain in this state until capacitor 14 recharges through resistance 20 to a point where tube 8 commences to conduct. At this instant the multivibrator will again regenerate to its stable state to thereby terminate the negative output pulse at the plate of tube 9.

In normal operation it is desired to provide capacitor 14 with a rapid discharge in response to an incoming pulse signal. For this purpose a diode type tube 6 is here shown connected in series with the path carrying the incoming signal pulse (negative in this case) to the grid of tube 8. This diode is arranged with its plate side at the grid of tube 8 and condenser 14 so that a negative pulse at its cathode will immediately discharge condenser 14. The cathode of diode 6 should have a quiescent bias equal to or greater than the grid of tube 8 unless it is desired to use same as an upper limit for grid bias and charge on condenser 14. As here shown the cathode of the diode 6 is biased by its connection to the cathode of a cathode follower tube 5. Said tube 5 is arranged so that its quiescent current causes a voltage drop across its cathode resistor 12 suitable for the requirements of said diode. With the arrangement as described, the amplitude of the negative signal pulse will determine the discharge level of said condenser 14, and therefore will also control the charging time of condenser 14.

As thus far described, the duration of the output pulse will depend upon the duration and amplitude of the input pulse. Furthermore, an input pulse applied during the operation of the circuit from a previous input pulse will further discharge the condenser to thereby extend the output pulse not only in relation to the amplitude and duration of the second input pulse but also the time relation of the two input pulses. It is usually desired to employ the circuit to extend the duration of any input pulse by a predetermined amount regardless of the time relation of the input pulses. To this end the condenser must not be allowed to discharge below a suitable level. Such a limit is herein provided by tying the cathode of a second diode 7 to condenser 14 at the side it connects the grid of tube 8. The plate of the second diode 7 is tied to a tap on a bleeder circuit 15, 16, and 17. The voltage on said plate should be set by potentiometer 15 to the desired discharge limit for condenser 14. Any condenser voltage more negative than that prescribed will be carried off through said diode. The setting of the potentiometer 15 controlling the discharge limit is one means of varying the amount of stretch applied to the input pulses because it determines the extent which the condenser must be recharged to fire the tube 8 at the constant charging rate determined by the time constant 14 and 20. A second control of the amount of pulse stretching is offered by the potentiometer 18 which controls the voltage toward which condenser 14 recharges. It may be desirable to have the circuit unresponsive to certain small amplitude pulses such as noise. This may be easily accomplished in the cathode follower stage by raising the grid bias on this tube 5, thereby increasing the quiescent current and the cathode bias. If this cathode bias is greater than the grid bias on the first multivibrator tube 8, only input pulses of greater amplitude than the difference in said bias voltages will be passed by the series diode 6 to discharge the condenser 14. The noise clipping level of the circuit may be adjusted by using a potentiometer 13 to supply the grid bias to the cathode follower tube 5.

Referring now to the explanatory waveforms in Fig. 2, waveform 30 represents a single negative pulse as it would appear at the input to the circuit in Fig. 1 or at the cathode of the first tube 5. The base line 36 is also the quiescent charge level of the capacitor 14 assuming an appropriate setting of the bias resistor 13. The horizontal broken line 37 represents the condenser discharge limit provided by the second diode 7 and the tap on the bleeder resistor 15. In waveform 31, which represents the same pulse as it will appear at the capacitor 14, the limiting action of said second diode may be noted. The vertical lines common to the three waveforms are used to indicate their time relations. It is seen therefore in waveform 31, that the capacitor begins to charge at the termination of the pulse. The dotted horizontal line 38 represents the cut off point for the first multivibrator tube 8 thus demonstrating that the negative pulse cuts off said tube with its leading edge and renders same conducting again when the capacitor has nearly regained its quiescent charge. Distance 41 represents the duration of the pulse and 39 the charging period required to fire the tube 8. Waveform 32 is the output pulse at the plate of the second multivibrator tube 9. It will be noted that its time duration 40 is the sum of the original pulse length 41 and the charging period 39.

In Fig. 3 the effect of a pair of closely grouped pulses (waveform 33) upon the circuit in Fig. 1 is demonstrated. As in Fig. 2, the vertical lines common to the waveforms are used to indicate their time relation. In waveform 34, which represents the voltage of capacitor 14, it is seen that the second pulse arrives before the condenser has recovered from the first pulse but that it is discharged to the same level 37 as before. The charging time 39 is now the same as it was for a single pulse (39 in Fig. 2). The output pulse waveform 35, has no discontinuity between or because of said pair of pulses and the second pulse will cause said output pulse to continue for its normal duration 40 as measured from the leading edge of said second pulse.

Although we have shown and described only limited and specific embodiments of the present invention, it is to be understood that we are fully aware of the many modifications possible thereof. Therefore, this invention is not to be limited except insofar as is necessitated by the spirit of the prior art and the scope of the appended claims.

We claim:

1. A pulse stretching circuit comprising, a pulse generating trigger circuit, a normally charged capacitor connected in parallel with the input to said trigger circuit to initiate an output pulse coincident with the discharge thereof, a charging path for said capacitor determining the charging rate thereof, means connected to said charging path for controlling said charging rate, a rapid discharge circuit connected to said capacitor for discharging same in response to and during an incoming pulse, and clamping means connected to said capacitor and biased to limit the discharge level thereof.

2. A pulse stretching circuit comprising, a pulse generating trigger circuit, a normally charged capacitor connected in parallel with the input to said trigger circuit to initiate an output pulse coincident with the discharge thereof and to terminate the output pulse after a predetermined charging thereof, a charging path for said capacitor determining the charging rate thereof, a first diode means connected to said capacitor, means responsive to and during an incoming signal to discharge said capacitor through said first diode means, and second diode means connected to said capacitor and biased to limit the discharge level thereof.

3. A pulse stretching circuit comprising, a pulse generating trigger circuit, a normally charged capacitor connected in parallel with the input to said trigger circuit to initiate an output pulse coincident with the discharge thereof and to terminate the output pulse after a predetermined charging thereof, a charging path for said capacitor determining the charging rate thereof, a first diode means connected to said capacitor and biased to limit the charging level thereof, means responsive to and during an incoming signal to unbias said first diode and discharge said capacitor therethrough, and second diode means connected to said capacitor and biased to limit the discharge level thereof.

4. A pulse stretching circuit comprising, a pair of vacuum tubes connected together in a regenerative manner so as to form a pulse generating trigger circuit having one stable state and one unstable state, a normally charged capacitor connected in parallel with the input of the one of said pair of tubes which is conducting during the stable state, a charging path for said capacitor determining the charging rate thereof, a first diode means connected to said capacitor and biased to limit the charging level thereof, means responsive to and during an incoming signal to unbias said first diode and discharge said capacitor therethrough, and second diode means connected to said capacitor and biased to limit the discharge level thereof.

5. A pulse stretching circuit comprising, a pair of vacuum tubes connected together in a regenerative manner so as to form a pulse generating trigger circuit having one stable state and one unstable state, a normally charged capacitor connected in parallel with the input of the one of said pair of tubes which is conducting during the stable state, a charging path for said capacitor determining the charging rate thereof, and a rapid discharge circuit connected to said capacitor to discharge same in response to and during an incoming signal.

CHARLES W. JOHNSTONE.
HAROLD V. HANCE.

References Cited in the file of this patent

UNITED STATES PATENTS

| Number | Name | Date |
|---|---|---|
| 2,241,256 | Gould | May 6, 1941 |
| 2,350,069 | Schrader et al. | May 30, 1944 |
| 2,405,843 | Moe | Aug. 13, 1946 |
| 2,411,573 | Holst et al. | Nov. 26, 1946 |
| 2,419,340 | Easton | Apr. 22, 1947 |
| 2,489,824 | Shenk | Nov. 29, 1949 |
| 2,589,085 | Houghton | Mar. 11, 1952 |